(No Model.) 2 Sheets—Sheet 1.

G. C. HOWELL.
FRUIT PITTER.

No. 484,154. Patented Oct. 11, 1892.

Witnesses  
Inventor  
G. C. Howell  
By his Attorneys, (No Model.) 2 Sheets—Sheet 2.

G. C. HOWELL.
FRUIT PITTER.

No. 484,154. Patented Oct. 11, 1892.

Witnesses  
E. C. Wiedeman  
H. J. Riley

Inventor  
G. C. Howell  
By his Attorneys,  
C. A. Snow & Co.

UNITED STATES PATENT OFFICE.

GEORGE CHANCY HOWELL, OF ALAMEDA, CALIFORNIA.

FRUIT-PITTER.

SPECIFICATION forming part of Letters Patent No. 484,154, dated October 11, 1892.

Application filed November 21, 1891. Serial No. 412,619. (No model.)

*To all whom it may concern:*

Be it known that I, GEORGE CHANCY HOWELL, a citizen of United States, residing at Alameda, in the county of Alameda and State of California, have invented a new and useful Fruit-Pitter, of which the following is a specification.

The invention relates to improvements in fruit-stoning machines.

The object of the present invention is to simplify and improve the construction of fruit-stoning machines and to increase their effectiveness and capacity.

The invention consists in the construction and novel combination and arrangement of parts hereinafter fully described, illustrated in the accompanying drawings, and pointed out in the claims hereto appended.

Figure 1:
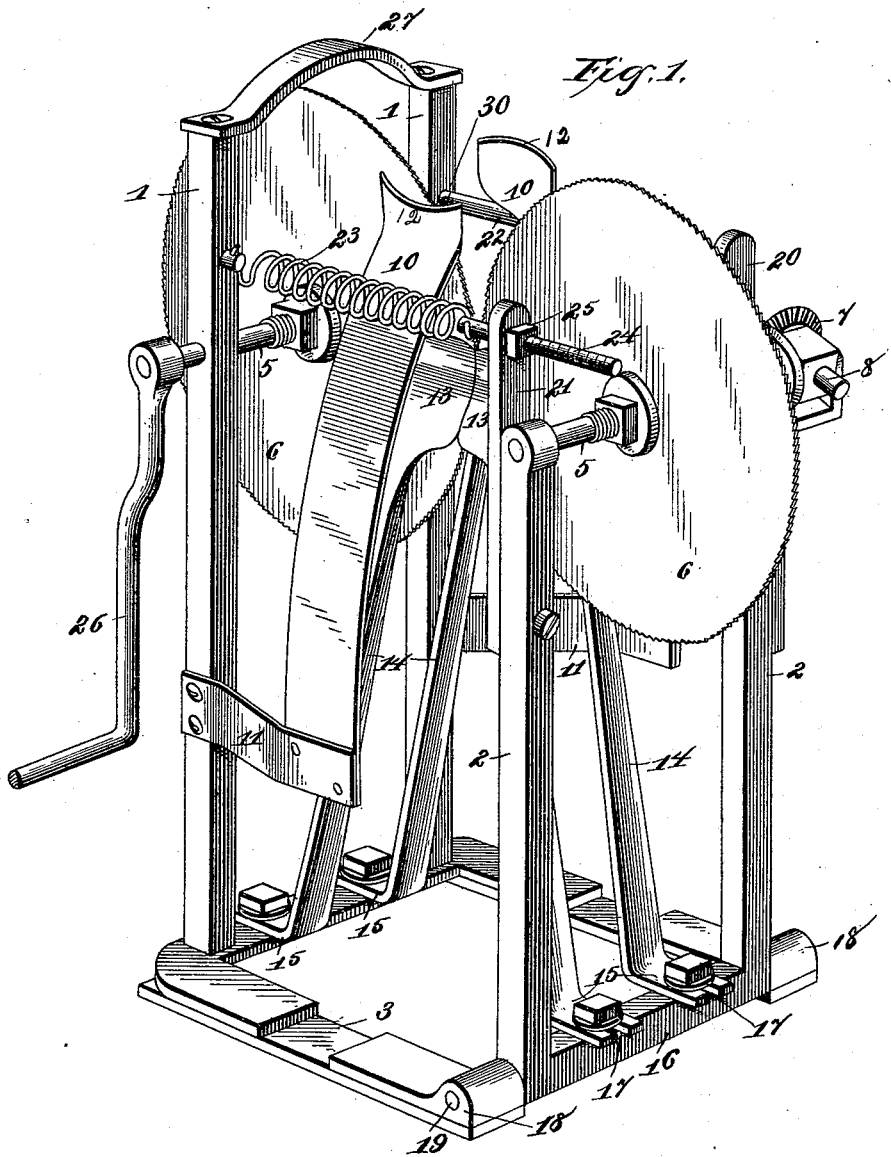
Figure 2:
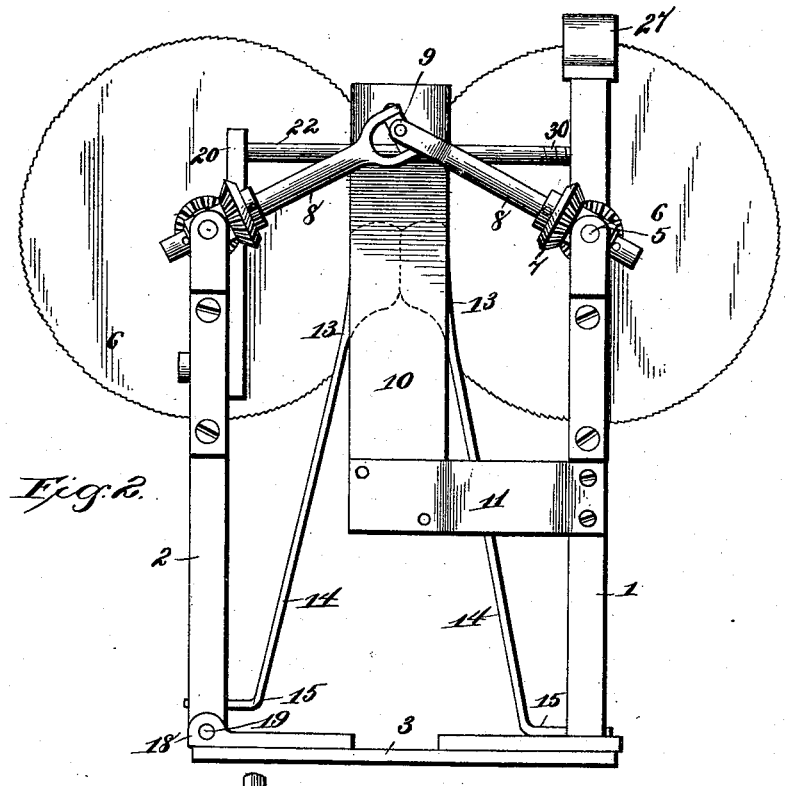
Figure 3:
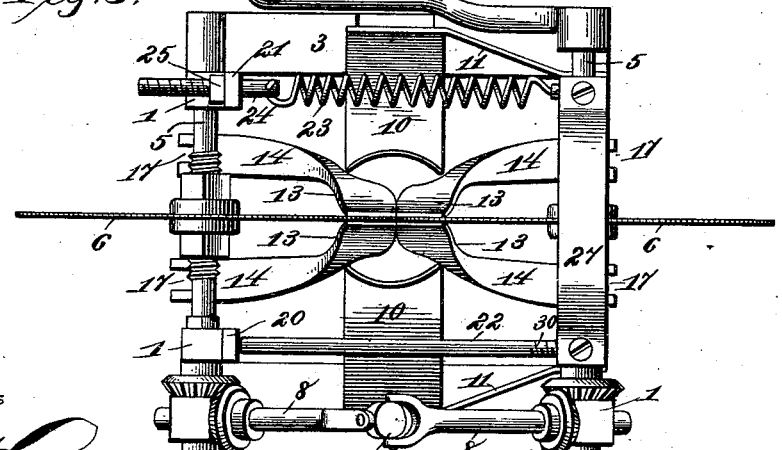

In the drawings, Figure 1 is a perspective view of a stoning-machine embodying the invention. Fig. 2 is a side elevation. Fig. 3 is a plan view.

Like numerals of reference indicate like parts in all the figures of the drawings.

1 and 2 designate uprights rising from a base 3 and forming with the same a frame and provided at their upper ends with bearing-openings, in which are journaled shafts 5, which carry circular-saw cutters 6, adapted to be rotated to divide a peach, plum, apricot, and similar stoned fruit. Each of the shafts 5 is connected at one end by beveled gears 7 with shafts 8, which have their inner ends connected by a universal joint 9.

The fruit is guided to the cutters by curved springs 10, arranged on opposite sides of the cutters near their meeting edges and having their lower ends secured to plates 11, and have their upper ends 12 transversely curved and arranged on opposite sides of the cutters to form a chute to direct fruit. A peach or similar fruit passing downward between the springs to the cutters is divided by the latter, the stone continuing downward between the cutters, which separate to permit the passage of the same, and the meat being separated from the stone and directed to opposite sides of the frame by blades 13, arranged in pairs and located on opposite sides of the cutters. The blades have their upper and adjacent edges sharpened, and are arranged at an inclination whereby the meat of the fruit is thrown outward, and they are provided with shanks 14, having their lower ends 15 bent horizontally and slotted to receive bolts, which secure them to the base 3 and to an integral cross-bar 16, connecting the lower ends of the uprights 2. The slots 17 in the lower ends 15 of the shanks permit the blades to be adjusted.

The uprights 2 are hinged to the base and are adapted to swing outward therefrom to carry their cutter-shaft outward away from the other cutter-shaft to separate the cutters to permit a stone to pass downward between them. The lower ends of the standards or uprights 2 are journaled in eyes 18 of the base by bolts 19, and the upper ends of the uprights 2 are provided with plates 20 and 21, the former of which engages a horizontal stop-bar 22 to prevent the uprights swinging inward too far, and the latter is connected by a spiral spring 23 with the adjacent upright 1, whereby the uprights 2 are held normally in a vertical position, and the cutters are held in operative position to sever or divide the meat of fruit. The spiral spring 23 has one end connected to an adjusting-screw 24, which is arranged in an opening of the plate 21, and is provided with a nut 25, and is adapted to regulate the tension of the spiral spring. One of the shafts 5 is extended, and has secured to it a crank-handle 26, by which the machine is operated. The shafts 8, by being connected by a universal joint, are adapted to yield to the swinging of the uprights 2 when the cutters are separated.

The horizontal plates 11 are constructed of spring metal, similar to the springs 10, and extend inward from the uprights 1 and are secured near the middle of the same. The upper ends of the uprights 1 are connected by a brace 27, which strengthens the frame and is curved or arched over the adjacent cutter.

The beveled gear-wheels are supported by brackets 29, secured to the uprights 1 and 2. The horizontal bar 22 has one end 30 threaded and engaging a threaded opening in one of the uprights 1, and it extends horizontally from the uprights and is adapted to be engaged by the plate 20.

What I claim is—

1. In a fruit-stoning machine, the combination of a base, uprights 1 and 2, mounted on the base, the latter being hinged to the same, shafts journaled on the uprights, cutters mounted on the shafts 5, shafts 8, having their inner ends connected by a universal joint, and beveled gears connecting the outer ends of the shaft 8 with the shafts 5, substantially as described.

2. In a fruit-stoning machine, the combination of a frame, shafts journaled in the frame, cutters mounted on the shafts, and springs arranged on opposite sides of the cutters and being curved throughout their length and having their upper ends transversely curved, substantially as described.

3. In a fruit-stoning machine, the combination of a frame, shafts journaled in the frame, cutters mounted on the shafts, springs arranged on opposite sides of the cutters and forming a chute, and blades arranged in pairs on opposite sides of cutters and being inclined and provided with shanks adjustably secured to the frame, substantially as described.

4. In a fruit-stoning machine, the combination of a frame, shafts journaled in the frame, cutters mounted on the shafts, springs arranged on opposite sides of the cutters and forming a chute, and blades arranged in pairs on opposite sides of the cutters and at right angles to the springs, substantially as described.

In testimony that I claim the foregoing as my own I have hereto affixed my signature in the presence of two witnesses.

GEORGE CHANCY HOWELL.

Witnesses:
   E. SANDFORD,
   J. F. WOODMAN.